Feb. 9, 1937. C. R. PATON 2,069,924
MOTOR VEHICLE FRAME
Filed Jan. 19, 1934 3 Sheets-Sheet 3
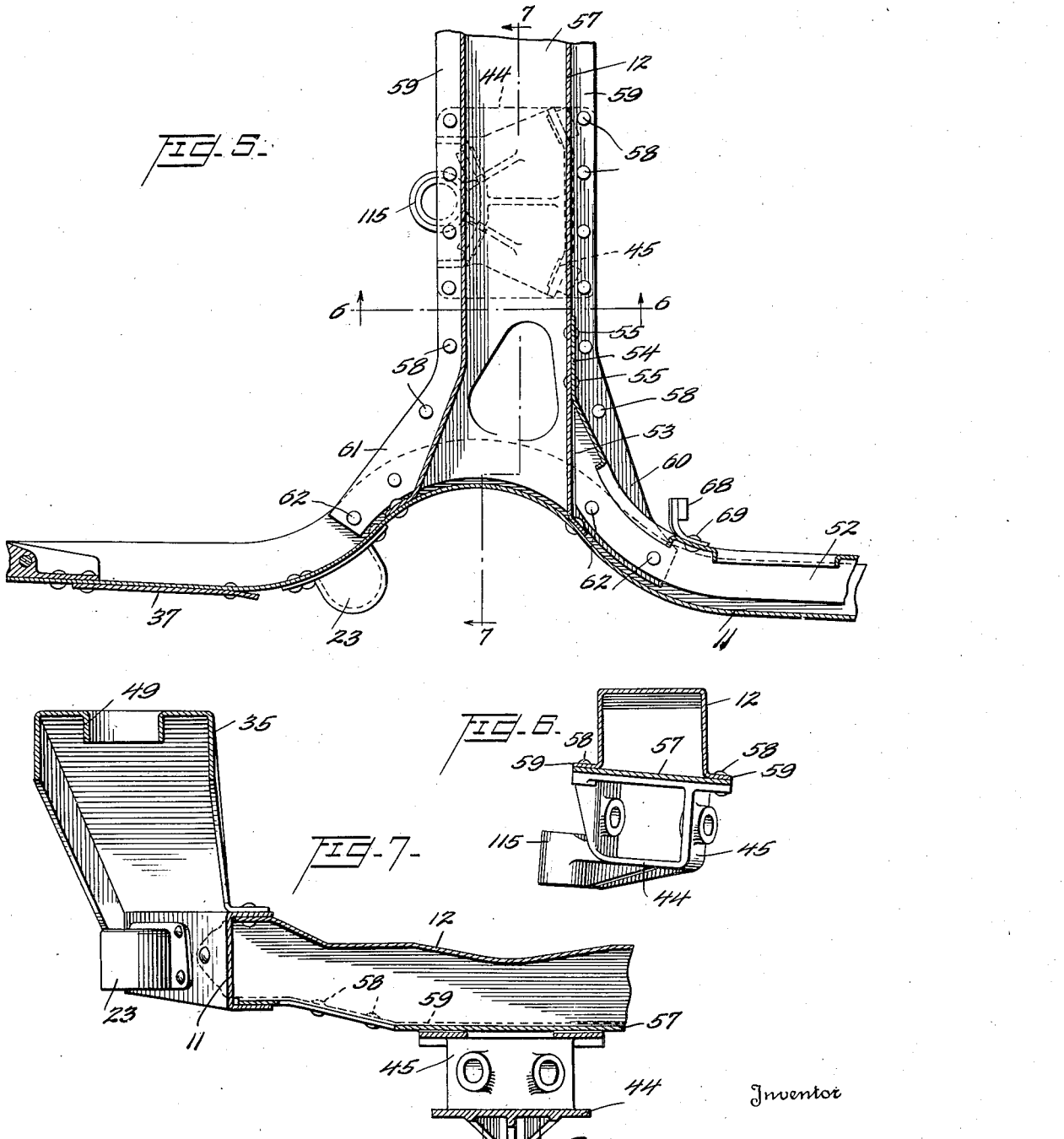

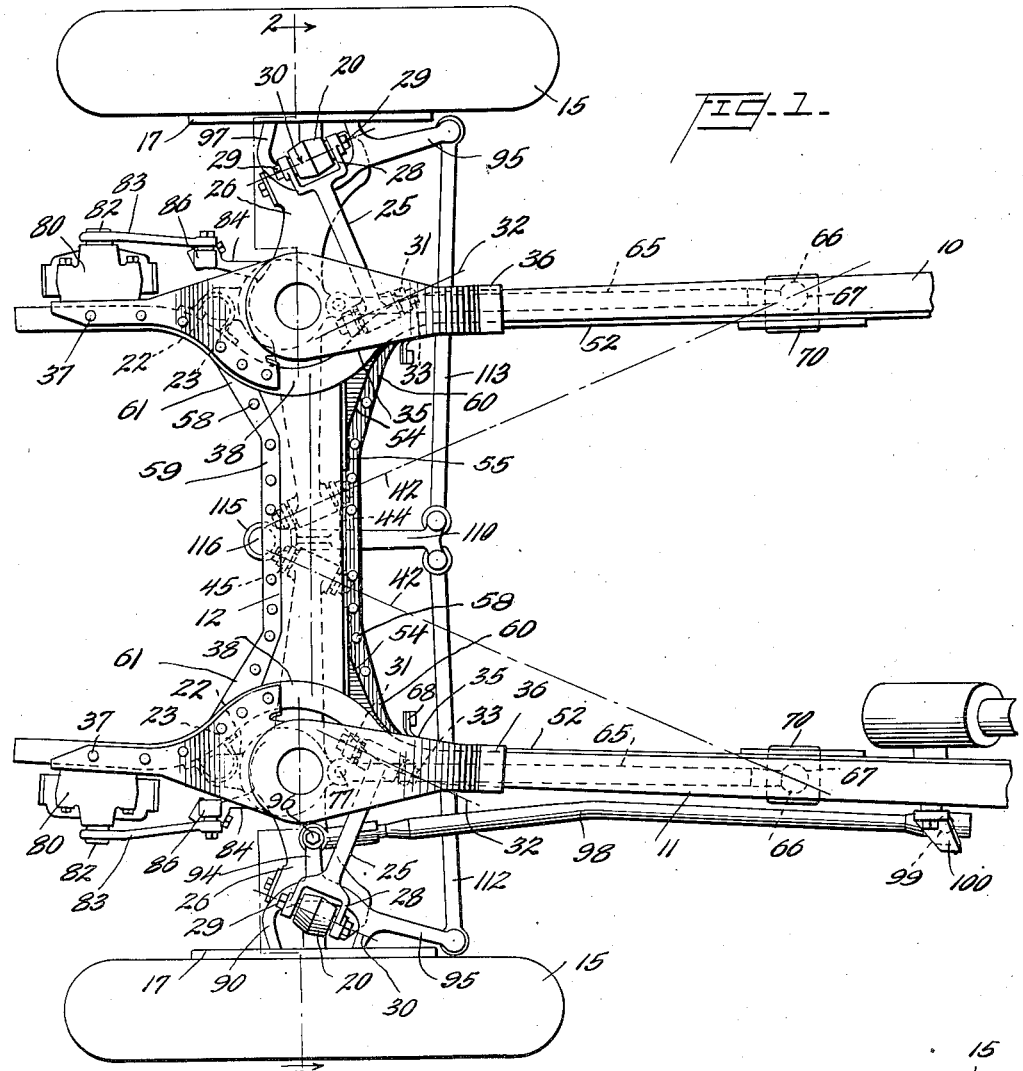

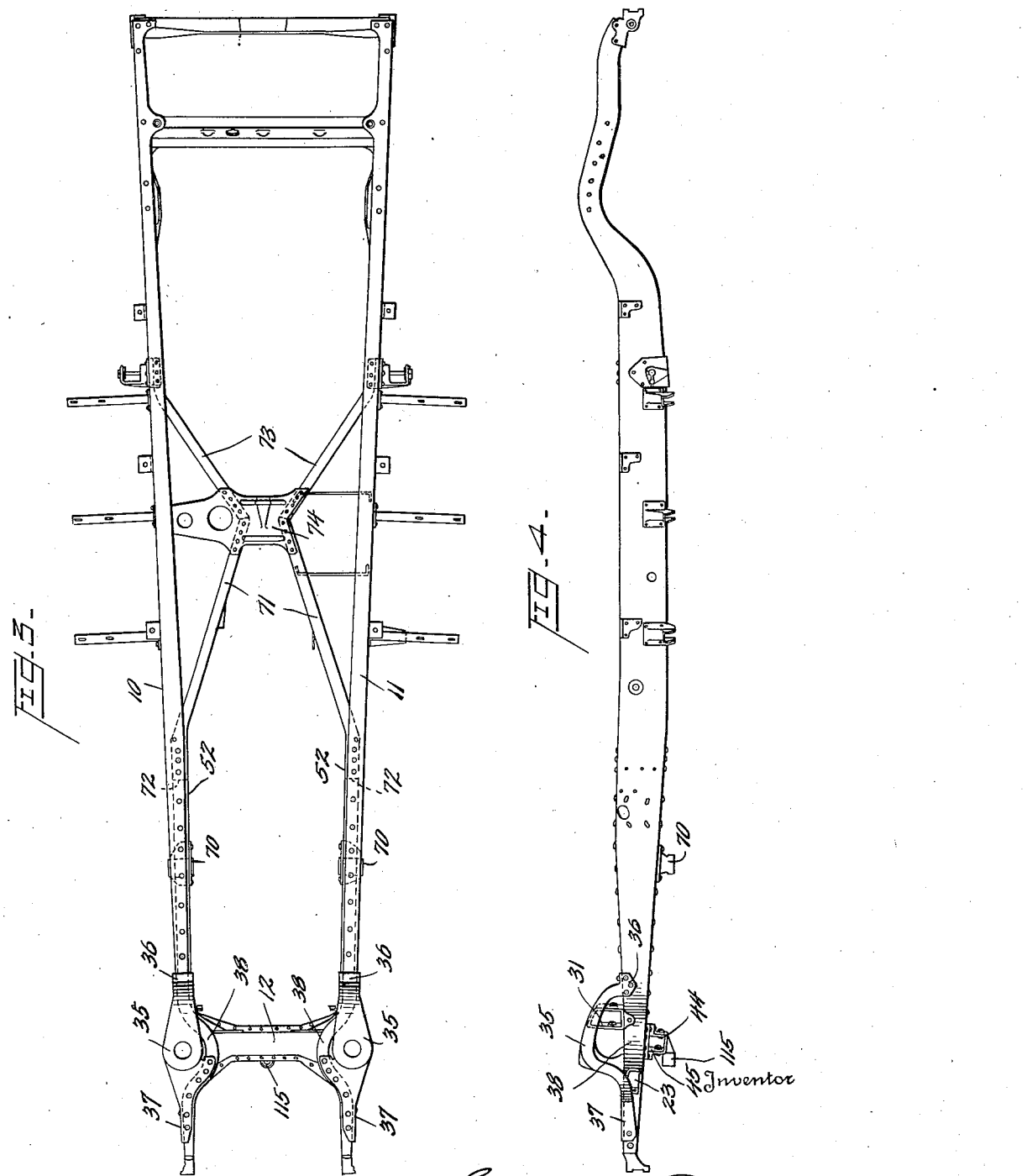

Patented Feb. 9, 1937

2,069,924

UNITED STATES PATENT OFFICE 2,069,924

MOTOR VEHICLE FRAME

Clyde R. Paton, Birmingham, Mich., assignor to Packard Motor Car Company, Detroit, Mich., a corporation of Michigan Application January 19, 1934, Serial No. 707,391

10 Claims. (Cl. 280—106)

This invention relates to motor vehicle frames and more particularly to frame constructions which are adapted to wheel suspension systems employing coil springs or to independent wheel suspension systems generally. It is the primary object of the invention to provide a vehicle frame construction which is extremely sturdy and yet relatively light and in which sacrifice of strength in the adaptation of the frame to wheel suspensions of the independent type is avoided.

This application is a continuation of my prior filed application for Letters Patent, Serial No. 702,615, filed December 15, 1933. In my prior application I have disclosed a motor vehicle wheel suspension in which the road wheels are supported for independent rising and falling movement with respect to the vehicle frame, such movement being yieldingly resisted by springs of the coil type. While it will be apparent from the following description that the vehicle frame construction shown in my prior application and claimed herein embodies numerous novel and useful features when applied either to vehicles of the conventional rigid axle type or to independent wheel suspensions differing from that disclosed in my prior application, it may be most conveniently described by reference to the specific form of wheel suspension illustrated in my prior application for which it is particularly designed and especially suited.

It is a more specific object of the invention to provide a frame structure for a vehicle of the type employing coil springs, this structure including the usual generally longitudinally extending side frame members, the latter being provided with spring seats carried by the frame members and located substantially in the vertical plane defined by the latter, whereby the thrust of the springs may be transmitted more direcly to the frame members, thus reducing the frame stresses. In the preferred embodiment of the invention the side frame members are curved adjacent their forward ends to provide inwardly directed portions which may partially embrace the coil springs, the spring seats bridging the generally straight portions on either side of these inwardly directed portions.

It is a further object of the invention to provide a frame structure for motor vehicles comprising side frame members rigidly united by a cross frame member, the cross frame member being adequately reinforced and so secured to the respective side frame members as to provide the maximum rigidity with a minimum of weight, both the cross frame member and the side frame members being employed as supports for the wheel suspension system.

Further objects and features of the invention will be apparent from the following description taken in connection with the accompanying drawings, in which Figure 1 is a plan view of a portion of a motor vehicle frame illustrating the application thereto of a wheel suspension system of the type disclosed in my prior application hereinbefore referred to;

Figure 2 is a transverse sectional view taken substantially on the line 2—2 of Figure 1;

Figure 3 is a plan view of the motor vehicle frame with parts of the wheel suspension removed;

Figure 4 is a side elevation of the construction shown in Figure 3;

Figure 5 is an enlarged view of a portion of the structure shown in Figure 3;

Figure 6 is a sectional view taken substantially on the line 6—6 of Figure 5; and Figure 7 is a sectional view taken substantially on the line 7—7 of Figure 5.

In describing the invention, specific reference will be made to the drawings showing one form of the invention only and illustrating the application of the invention to a preferred type of wheel suspension system. It will nevertheless be understood that no limitation of the invention is intended, either with respect to the form of wheel suspension illustrated, or by reason of the employment of specific language selected for the purpose of facilitating an understanding of the invention, except as otherwise definitely indicated in the claims appended hereto. Various alterations of the structural details such as fall within the scope of the invention as defined in these claims are contemplated.

Referring first to Figures 1 and 2 of the drawings, it will be observed that the vehicle frame is illustrated as including side frame members 10 and 11, which may be of the usual channel type, and a cross frame member 12 extending between and rigidly secured to the two side frame members 10 and 11 adjacent the forward end of the latter. So far as the wheel suspension is concerned, the construction is preferably identical at the two sides of the vehicle, and it will therefore suffice in the following description to refer to those elements of the suspension disposed at one side only of the central longitudinal plane of the vehicle, the same reference characters being used in connection with corresponding elements associated with the two road wheels.

Thus each road wheel 15 is rotatably mounted in the conventional manner on a wheel spindle 16, the latter being provided with the usual brake backing plate 17. The wheel spindle 16 is preferably formed integrally with a steering knuckle 18, the latter being supported for swinging steering movement on a knuckle carrying member 20, for instance, by means of the usual king pin 21 which may extend through the knuckle and its supporting member.

The knuckle carrying member 20 is formed to provide upstanding and downwardly directed arms which constitute with the member 20 an integral unit. Since the precise shape of this member is not material, these integrally formed arms need not be separately designated, but in the form of the invention shown in the drawings they are pivotally connected respectively to upper and lower wheel supporting links 25 and 26 which are in turn pivotally connected at their inner ends to the vehicle frame. Thus the outer end of the wheel supporting link 25 may be formed to provide a yoke-shaped portion 28 embracing the upper end of the knuckle carrying member 20, the bolt 29 passing through the link 25 and the member 20 to connect the link and the member for relative movement about a pivotal axis 30. The inner end of the link 25 is similarly supported within a yoke-shaped member 31 for pivotal movement with respect thereto about an axis 32, a bolt 33 passing through the member 31 and the link 25, the axes 30 and 32 being parallel.

The yoke-shaped member 31 is supported between the side frame member 10 or 11 and the frame bracket 35 and is rigidly secured to both, the bracket 35 being preferably shaped as shown in Figures 1, 3, and 4 of the drawings and being secured to the side frame member as at 36 and 37, thus forming in effect a continuation of the side frame member, the latter being deflected or curved inwardly as at 38 adjacent the road wheel for a purpose hereinafter described.

The lower wheel supporting link 26 is similarly pivotally connected to the knuckle carrying member 20 and to the vehicle frame for swinging movement with respect to both about pivotal axes 40 and 42 respectively, the pivotal connection at the inner end of the wheel supporting link 26 to the frame including a bracket 44 which is secured to and dependent from the cross frame member 12 and which is provided with yoke-shaped portions 45 embracing the inner ends of the two links 26 at opposite sides of the center line of the vehicle, this construction being shown more particularly in Figure 6 of the drawings.

Means are provided to limit the upward movement of the wheel supporting links 25 and 26 and thereby the extent to which the associated road wheel assembly may rise. For instance, this means may comprise a forwardly directed lug 22 preferably formed integrally with each lower link 26, and a bracket 23 secured to the adjacent side frame member and provided with a cup-shaped portion receiving a block of rubber or other deformable material, the rubber block being located in the path of movement of the lug 22. It will be understood that under normal conditions the links 26 will not rise to a sufficient extent to engage the rubber blocks carried by the frame but it is desirable to provide some yielding abutment for the links, particularly for an emergency such as the breakage of the vehicle springs.

Each lower wheel supporting link 26 is provided intermediate its ends with a spring seat 47 and an upstanding boss 48 on the upper face thereof, the latter forming a guide for a coiled spring 50 which is interposed under compression between the link 26 and the bracket 35, the latter being provided with a downwardly directed annular flange 49 forming a guide to receive the upper end of the spring 50.

In order to adequately resist braking torque and other stresses in the wheel suspension, a torque arm 65 is provided, this torque arm having a pivotal connection about a substantially vertical axis with the wheel suspension system and an articulated connection with the vehicle frame. Thus the torque arm 65 extends substantially longitudinally of the vehicle and may be provided at its rear end with a substantially spherical head 66 which is received in a complementary semi-spherical seat 67 comprised in a bracket 70 secured to the adjacent side frame member. At its forward end the torque arm 65 is provided with a yoke-shaped portion receiving a rearwardly directed lug which is preferably formed integrally with the lower wheel supporting link 26, a bolt 77 passing through the torque arm and the lug.

It is an important feature of this construction that practically the entire stress which is applied to the wheel suspension by the vehicle load and on braking of the vehicle is carried through the lower link 26 and the torque member 65 to the frame with the result that the strain on the bearings normally resulting from application of the brakes is greatly reduced. At the same time the lower members of the wheel suspension may be the larger and sturdier, the upper link and associated parts being relatively light, whereby the center of gravity of the suspension is maintained as low as possible.

Shock absorbers 80, likewise acting through the lower links, are preferably carried on the vehicle frame and are illustrated as secured to the side frame members 10 and 11 adjacent the respective forward ends of the latter and forwardly of the wheel suspension. The location of the shock absorbers at the extreme forward end of the frame reduces materially the tendency of the vehicle to rock about transverse axes, the mass balance of the frame being improved. Furthermore, the shock absorbers when so positioned are rendered accessible for replacement or repair without disturbing the wheel suspension.

The operating connections to each shock absorber may comprise the usual shaft 82 extending within the housing 80 and having secured thereto exteriorly of the housing a rearwardly extending arm 83 which is in turn connected with a lug 84, formed integrally with the lower wheel supporting link 26, by means of a rod 86 having articulated connection with the arm 83 and the lug 84. Thus, as either road wheel rises and falls, the corresponding shaft 82 will be rocked to effect movement of fluid within the housing 80, thus tending to damp the wheel movement.

Referring now to the steering mechanism, it will be observed that the steering knuckle 18 at the left-hand side of the vehicle carries the steering lever 90 which is preferably secured to the knuckle as at 91, this lever having an inwardly directed arm 94 and a rearwardly directed arm 95. The arm 94 is pivotally connected as at 96 to a rod 98 serving as a steering drag link, the latter having a pivotal connection at 99 to the usual steering drop arm 100.

The rearwardly directed arm 95 of the steering lever 90 at the left-hand side of the vehicle is connected to a lever 110 by means of a tie rod 112 having articulated connection with the arm 95 and the lever. At the right-hand side of the vehicle a similar steering arm 96 is formed on a steering lever 97 rigidly secured to the adjacent steering knuckle 18, and the arm 96 is likewise connected with the lever 110 by means of a tie rod 113. The lever 110 is supported for pivotal movement about a substantially vertical axis on the bracket 44 hereinbefore referred to, this bracket being provided with a forwardly extended boss 115, a bolt 116 passing through the boss and serving as a fulcrum for the lever 110 as shown more particularly in Figure 6 of the drawings. By means of this construction the two road wheels are caused to execute similar steering movements in response to displacement of the steering drag link 98 longitudinally of the vehicle.

As hereinbefore mentioned, each side frame member 10, 11 is provided with an inwardly directed portion adjacent the forward end thereof, the side frame members being generally straight as viewed in plan. The bracket 35 is secured to the associated side frame member on either side of the inwardly directed portion thereof so as to bridge the gap between the substantially straight portions of the side frame member. The side frame members are substantially straight as viewed in elevation and therefore define a common horizontal plane as indicated in Figure 4, the bracket 35 extending upwardly from this common plane so that the spring seat 49 thereof lies above the side frame members but substantially in the vertical planes defined by these side frame members. By reason of this construction the coil springs at either side of the vehicle lie substantially in the vertical planes or on the neutral axes of the side frame members and thus the load carried by the springs does not tend to twist the frame, and stresses on the frame and spring support are materially reduced. It will furthermore be observed that this construction permits bringing the coil springs closer to the center of the frame and also effects strengthening of the side frame members, the entire forward portion of the side frame members lying in the same generally horizontal plane and being therefore capable of sustaining greater loads than upwardly curved frame members.

Each side frame member is reinforced at the inwardly directed portion thereof by the bracket 35 and by the yoke-shaped member 31 which affords a point of pivotal support for the upper link, the member 31 extending between and being secured to both the bracket 35 and the side frame member. Further reinforcing of the frame at this point is effected by means of a structural member 52, preferably of channel section, having the open side thereof directed outwardly and secured to the associated side frame member in such manner as to form a box structure, for instance by fitting therein. The legs of the channel section comprising the member 52 are cut away as indicated at 53 adjacent the forward end of the member to conform generally to the side wall of the cross frame member 12 at that point, and the base of the member 52 is continued as indicated at 54 and is riveted or otherwise secured as at 55 to the cross frame member 12. Motor supporting brackets 68 by which the forward end of the motor is carried may be secured as at 69 to the base of the channel section 52.

As shown in the drawings, each member 52 may be extended rearwardly to form part of an X frame construction located adjacent the central portion of the vehicle and extending between the side frame members to strengthen the latter. Thus the X frame members 71 may be formed integrally with the members 52 or welded thereto as indicated at 72. The X frame construction is completed in the usual manner by the structural members 73, the latter being rigidly secured to the side frame members 10 and 11 toward the rear of the vehicle and being united with the members 71 by means of a connecting plate 74.

The major portion of the cross frame member 12 is of channel section, reinforced by a plate 57 which is riveted or otherwise secured as at 58 to flanges 59 formed integrally with and extending laterally of the member 12, so that a completely closed structure is provided. On either side of the vehicle the flanges 59 are widened as indicated at 60 and 61, and are secured as at 62 to the adjacent side frame member, the points of attachment of each side frame member to the cross frame member 12 being thus spaced to a considerable extent as measured longitudinally of the vehicle to prevent twisting of the frame.

It will be observed that this construction is extremely sturdy and yet may be of relatively light weight, affording adequate strength to carry the supporting links for the road wheels and the load transmitted through the springs to the frame, extreme rigidity being obtained through the use of structural members forming closed sections.

Having thus described the invention, what is claimed as new and desired to be secured by Letters Patent is:

1. In a motor vehicle, the combination with generally longitudinally extending side frame members, said frame members defining a common, substantially horizontal plane with the forward portions thereof lying wholly in said plane, the forward portion of said members being generally straight as viewed in plan, but being deformed to provide an inwardly directed, generally U-shaped portion united with the straight portions on either side thereof, of members bridging the inwardly extending portions of said side frame members and secured to the generally straight portions thereof, said last named members lying generally in the vertical planes defined by the straight portions of said side frame members.

2. In a motor vehicle, the combination with generally longitudinally extending side frame members, said frame members defining a common, substantially horizontal plane with the forward portions thereof lying wholly in said plane, the forward portion of said members being generally straight as viewed in plan, but being deformed to provide an inwardly directed, generally U-shaped portion united with the straight portions on either side thereof, of members bridging the inwardly extending portions of said side frame members and secured to the generally straight portions thereof, said last named members lying generally in the vertical planes defined by the straight portions of said side frame members and being of generally U-shape to extend above the common substantially horizontal plane defined by said side frame members.

3. In a motor vehicle, the combination with generally longitudinally extending side frame members, said frame members defining a common, substantially horizontal plane with the forward portions thereof lying wholly in said plane, the forward portion of said members being generally straight as viewed in plan, but being deformed to provide an inwardly directed, generally U-shaped portion united with the straight portions on either side thereof, of members bridging the inwardly extending portions of said side frame members and secured to the generally straight portions thereof, said last named members lying generally in the vertical planes defined by the straight portions of said side frame members and being of generally U-shape to extend above the common substantially horizontal plane defined by said side frame members, and a cross frame member extending between and secured rigidly to the inwardly extending portions of said side frame members.

4. In a motor vehicle of the type employing independent, coil spring suspension, the combination with generally longitudinally extending side frame members, of a spring seat secured to each side frame member, and a wheel supporting member extending between and secured to each side frame member and the associated spring seat.

5. In a motor vehicle of the type employing independent, coil spring suspension, the combination with generally longitudinally extending side frame members, of a spring seat secured to each side frame member, a wheel supporting member extending between and secured to each side frame member and the associated spring seat, a cross frame member extending between said side frame members, and wheel supporting means carried by said cross frame member.

6. In a motor vehicle, the combination with generally longitudinally extending side frame members, said frame members defining a common, substantially horizontal plane with the forward portions thereof lying wholly in said plane, the forward portion of said members being generally straight as viewed in plan, but being deformed to provide an inwardly directed, generally U-shaped portion united with the straight portions on either side thereof, of members bridging the inwardly extending portions of said side frame members and secured to the generally straight portions thereof, and wheel supporting means secured to said second named members.

7. In a motor vehicle, the combination with a frame including generally longitudinally extending side frame members, the forward portion of each side frame member defining substantially horizontal and vertical planes, each side frame member being deformed to provide a portion extending out of the said vertical plane intermediate the ends of the member, of a spring seat associated with each member adjacent the last named portion thereof, each of said spring seats being disposed substantially in the vertical plane defined by the associated member and being secured thereto at longitudinally spaced points to bridge the deformed portion thereof.

8. In a motor vehicle, the combination with a frame including generally longitudinally extending side frame members, the forward portion of each side frame member defining substantially horizontal and vertical planes, each side frame member being deformed to provide a portion extending out of the said vertical plane intermediate the ends of the member, of a spring seat associated with each member adjacent the last named portion thereof, each of said spring seats being disposed substantially in the vertical plane defined by the associated member and being secured thereto at longitudinally spaced points to bridge the deformed portion thereof, and a cross frame member extending between and secured to the deformed portions of said side frame members.

9. In a motor vehicle, the combination with generally longitudinally extending side frame members, said frame members defining a common, substantially horizontal plane with the forward portions thereof lying wholly in said plane, the forward portion of said members being generally straight as viewed in plan, but being deformed to provide a generally U-shaped portion united with the straight portions on either side thereof, of a transverse frame member extending between and rigidly secured to the U-shaped portions of said side frame members, and a member additional to said transverse frame member bridging the U-shaped portion of each of said side frame members and secured to the generally straight portions thereof.

10. In a motor vehicle, the combination with generally longitudinally extending side frame members, said frame members defining a common, substantially horizontal plane with the forward portions thereof lying wholly in said plane, the forward portion of said members being generally straight as viewed in plan, but being deformed to provide a laterally directed, generally U-shaped portion united with the straight portions on either side thereof, of members bridging the laterally extending portions of said side frame members and secured to the generally straight portions thereof, said last named members lying generally in the vertical planes defined by the straight portions of said side frame members.

CLYDE R. PATON.